United States Patent [19]

Fletcher

[11] Patent Number: 4,570,589

[45] Date of Patent: Feb. 18, 1986

[54] METHOD FOR REDUCING DAMAGE ASSOCIATED WITH DETONATION AND/OR DESTRUCTIVE KNOCK

[75] Inventor: Edward A. Fletcher, Minneapolis, Minn.

[73] Assignee: Regents of the University of Minnesota, Minneapolis, Minn.

[21] Appl. No.: 672,466

[22] Filed: Nov. 19, 1984

Related U.S. Application Data

[62] Division of Ser. No. 406,484, Aug. 9, 1982, Pat. No. 4,501,236.

[51] Int. Cl.⁴ .............................................. F02F 3/14
[52] U.S. Cl. .................................................. 123/193 P
[58] Field of Search ......... 123/193 R, 193 CP, 193 P, 123/59 BS, 48 R, 309, 307, 65 S

[56] References Cited

U.S. PATENT DOCUMENTS

| | | | |
|---|---|---|---|
| 601,476 | 5/1948 | Robotham | 123/191 |
| 1,656,358 | 1/1928 | Moore | 123/658 |
| 1,673,775 | 6/1928 | Moore | 123/193 P |
| 1,758,242 | 5/1930 | Wehr | 123/253 |
| 2,007,767 | 7/1935 | Moore | 123/193 R |
| 2,151,927 | 3/1939 | McKone | 123/658 |
| 2,662,513 | 12/1953 | Bodine, Jr. | 123/281 |
| 2,662,515 | 12/1953 | Bodine, Jr. | 123/193 P |
| 2,662,516 | 12/1953 | Bodine, Jr. | 123/193 P |
| 2,686,512 | 8/1954 | Beam | 123/193 P |
| 2,688,320 | 9/1954 | Czarnocki | 123/193 CP |
| 2,692,590 | 10/1954 | Bodine, Jr. | 123/287 |
| 2,712,816 | 7/1955 | Bodine, Jr. | 123/660 |
| 2,735,416 | 2/1956 | Ferguson et al. | 123/193 CP |
| 2,738,781 | 3/1956 | Bodine, Jr. | 123/265 |
| 2,738,782 | 3/1956 | Bodine, Jr. | 123/193 P |
| 2,739,583 | 3/1956 | Bodine, Jr. | 123/660 |
| 2,752,908 | 7/1956 | Bodine, Jr. | 123/193 P |
| 2,760,472 | 8/1956 | Bodine, Jr. | 123/660 |
| 2,760,473 | 8/1956 | Bodine, Jr. | 123/193 P |
| 2,760,475 | 8/1956 | Bodine, Jr. | 123/193 P |
| 2,760,476 | 8/1956 | Bodine, Jr. | 123/193 P |
| 2,760,477 | 8/1956 | Bodine, Jr. | 123/193 P |
| 2,815,014 | 12/1957 | Adams | 123/193 P |
| 2,826,185 | 3/1958 | Keydel et al. | 123/671 |
| 2,827,033 | 4/1958 | Bodine, Jr. | 123/193 P |
| 2,828,731 | 3/1958 | Bodine, Jr. | 123/193 P |
| 2,881,751 | 4/1959 | Bodine, Jr. | 123/193 P |
| 2,951,473 | 9/1960 | Bodine | 123/193 P |
| 2,969,786 | 1/1961 | Dolza | 123/661 |
| 3,063,438 | 11/1962 | Bodine, Jr. | 123/193 P |
| 3,456,638 | 7/1969 | Bodine | 123/193 P |
| 3,601,008 | 8/1971 | Alexander | 123/193 P |
| 3,766,900 | 10/1973 | Aiti | 123/193 P |
| 3,834,364 | 9/1974 | Bartholomew | 123/660 |
| 4,026,250 | 5/1977 | Funiciello | 123/193 CP |
| 4,041,923 | 8/1977 | Konishi et al. | 123/193 R |
| 4,046,116 | 9/1977 | Burnham | 123/193 P |
| 4,069,794 | 1/1978 | Jordan | 123/193 P |
| 4,143,624 | 3/1979 | Schmidt | 123/193 P |
| 4,162,661 | 7/1979 | Nakanishi et al. | 123/193 P |
| 4,167,930 | 9/1979 | McNair, Jr. | 123/291 |
| 4,170,966 | 10/1979 | Schmidt | 123/65 S |
| 4,182,279 | 1/1980 | Sato et al. | 123/193 H |
| 4,235,203 | 11/1980 | Thery | 123/193 P |

*Primary Examiner*—Craig R. Feinberg
*Assistant Examiner*—David A. Okonsky
*Attorney, Agent, or Firm*—Burd, Bartz & Gutenkauf

[57] ABSTRACT

A method of attenuating detonation in an internal combustion engine having a combustion chamber and a piston reciprocably located in a cylinder forming the combustion chamber. The piston has an air/fuel mixture intake, compression, power, and exhaust movement. An air/fuel mixture is introduced in the combustion chamber during the intake movement of the piston. The air/fuel mixture is compressed in the combustion chamber. The compressed air and fuel is ignited with spark at the completion of the compression movement of the piston causing the air/fuel mixture to burn and establishing a flame front that propagates across the combustion chamber. The combustion chamber abruptly increases in the cross sectional area in the direction of travel of the flame front. The expanding burning air/fuel mixture in the combustion chamber moving across the abrupt increase in cross sectional area of the combustion area attenuates detonation in the combustion chamber.

21 Claims, 15 Drawing Figures

METHOD FOR REDUCING DAMAGE ASSOCIATED WITH DETONATION AND/OR DESTRUCTIVE KNOCK

CROSS REFERENCE TO RELATED APPLICATION

This application is a division of U.S. application Ser. No. 406,484 filed Aug. 9, 1982, now U.S. Pat. No. 4,501,236, issued Feb. 26, 1985.

FIELD OF INVENTION

The invention is in the field of reciprocating piston internal combustion engines having piston and cylinder structures shaped to reduce damage associated with detonation and/or destructive knock.

BACKGROUND OF INVENTION

The thermal efficiency of an Otto cycle internal combustion engine depends on the compression ratio. An increase in the compression ratio increases the thermal efficiency of the engine and frequently entails an increase in the tendency of the engine to knock. Compression ratios of the spark ignition engine are now limited by knock.

The knock in internal combustion engines is associated with the sounds that are created by the engines. Knock associated phenomena can sometimes destroy an engine within minutes. Destructive knock may be associated with detonation during the combustion of the fuel in the combustion chamber.

Flames in the combustion chamber may propagate through the combustible mixtures either as deflagrations or as detonations or they may originate at spontaneous ignition sites. Deflagrations are subsonic and associated with small spatial pressure variations. Detonations are supersonic. They are associated with large pressure discontinuities and impact pressures. The pressure discontinuities and impact pressures can cause the damage associated with knock.

Conventional combustion chamber design is such as to promote turbulence. The cross sectional area of the combustion chamber decreases in the region of the end gas to produce a quench or squish zone. Without turbulence, the highly agitated motion of the fuel air mixture, slow combustion would result in inefficient operation of the engine. This shape of the combustion chamber does not inhibit detonation.

Detonation in an internal combustion engine chamber produces sound and pressure stresses. Various devices have been proposed to eliminate detonation by attenuating the high amplitude of these pressure stresses. Bodine, in U.S. Pat. No. 2,760,472, utilizes a sound wave absorber pad between the block and the head to attenuate the high amplitude detonation into sound waves. The piston has a truncated inverted cone shape. Kydel et al. discloses, in U.S. Pat. No. 2,826,185, an internal combustion engine having a piston equipped with a projection. The projection is mounted on top of the mid-section of the piston and has downwardly and outwardly sloping flat surfaces. The head is provided with a firing chamber that decreases in size toward the center of the piston. Polza, in U.S. Pat. No. 2,969,786, shows an internal combustion engine having a piston with an angularly related face providing a firing chamber adjacent to a spark plug. Burnham, in U.S. Pat. No. 4,046,116, shows a piston for an internal combustion engine carrying a plate to increase the compression ratio of the engine. The plate has an upwardly sloping side wall facing the valves to provide clearance for the valves. Takeshi, in U.S. Pat. No. 4,162,661, shows a piston for an internal combustion engine having two separate raised portions located at two peripheral portions of the top of the piston. The ends of the raised portions have concave surfaces to provide for mixing of an air/fuel mixture to enhance combustion and increase engine output power. Thery, in U.S. Pat. No. 4,235,203, shows a two-zone combustion chamber formed by a piston having an upwardly directed projecting part that divides the combustion chamber into two portions. The projecting part has a channel providing communication between the parts of the combustion chamber. These piston structures and combustion chamber shapes have some effect on detonation, but do not control detonation to allow high compression ratios without damage to the piston and head.

SUMMARY OF INVENTION

The invention is directed to a method and piston and cylinder structure of an internal combustion engine for preventing destructive detonation in the combustion chamber of the internal combustion engine. The combustion chamber of the invention formed by the piston face and head has a configuration that attenuates detonation during the combustion episode of an internal combustion engine.

In the method of reducing detonation in an internal combustion engine, the air/fuel mixture is introduced into the combustion chamber during the intake stroke of the piston means. The piston means compresses the air/fuel mixture. A spark ignites the compressed air/fuel mixture causing combustion or burning of the air/fuel mixture. The burning rate of the air/fuel mixture is dependent on turbulent gas flow motions. The turbulence affects flame speed and detonation. The flame front moves across the combustion chamber. During this movement, there is an abrupt increase in the cross sectional area of the combustion chamber in the direction of the flame travel causing an attenuation of the detonation wave and/or an incipient detonation wave, thereby inhibiting damaging knock. In one embodiment of the method, the flame front initially is directed into diverging paths, including a central path, which is divided into secondary diverging paths. At the terminal portions of all the paths, there is an abrupt increase in the cross sectional area in the direction of the flame travel, of the combustion chamber, causing an attenuation of the detonation wave or of an incipient detonation wave, thereby inhibiting damaging knock. The burning fuel mixture forms an expanding gas that is utilized in the power stroke of the engine. The cycle of the engine is completed by the exhausting of the gas in the cylinder prior to a subsequent intake of the next air/fuel mixture.

According to the invention, there is provided a cap means for a piston of an internal combustion engine provided with an abrupt angled wall providing an abrupt increase in the cross sectional area of the combustion chamber in the direction of the flame travel across the combustion chamber which attenuates detonation and/or incipient detonation. In one embodiment, the wall extends transversely across the diameter of the top of the piston and has an angle of substantially 90 degrees with respect to the top of the piston. In another embodiment, the wall has a convex curve with a radius of curvature centered at the electrodes of the spark plug. The wall curves across the mid-section of the top of the piston and has an angle of substantially 90 degrees with respect to the top of the piston. The angle of the wall with respect to the top of the piston can have an angle of more than 90 degrees and still achieve an abrupt increase in the cross sectional area of the combustion chamber in the direction of movement of the flame front. The cap means can be secured to the top of a piston or be integral with the top of the piston. The cap means can have one or more divergent channels providing paths for dissipating detonation in an internal combustion engine. The channels terminate at the abrupt transverse wall providing an abrupt increase in the cross sectional area of the combustion chamber in the direction of the flame travel across the entire chamber, which attenuates detonation and/or incipient detonation.

A specific embodiment of the internal combustion engine has cylinder means with inside cylindrical walls surrounding piston means. Head means mounted on the cylinder means form with the piston means a combustion chamber. Spark generating means, such as a spark plug, mounted on the head means are operable to provide electrical energy to ignite a compressed air/fuel mixture in the combustion chamber. Cap means secured to or part of the top of the piston means has an abrupt step extended across the top of the piston generally normal to the direction of movement of the flame front, which results in attenuation of detonation and/or incipient detonation.

The cap means may have an upwardly and inwardly inclined front face directly opposite the ignition electrodes of a spark plug or means for generating an ignition spark. The front face may merge with a downwardly or inwardly inclined rear face. The rear face joins a transverse wall extended across the piston top. The transverse wall extends in the direction of movement of the piston generally normal to the top of the piston. The front face has a central concave diverging channel and rearwardly converging arcuate walls which extend from opposite sides of the central channel to opposite ends of the transverse wall. The rear face has a pair of diverging channels located on opposite sides of the center portion of the cap means. The second channels extend to the transverse wall. The flame front initially emanates from the region of the spark electrodes. The flame front moves upwardly through the path formed by the central channel and outwardly and rearwardly through side paths adjacent side walls to the rear face. The flame front then moves over the transverse wall and is subjected to retardation due to the abrupt increase in the cross sectional area of the combustion chamber in the direction of flame travel. This causes the attenuation of the detonation and/or incipient detonation to permit the engine to operate at higher compression ratios, thus, without concomitant damage increasing the thermal efficiency of the engine without damaging it.

DESCRIPTION OF PREFERRED EMBODIMENTS

Figure 1:
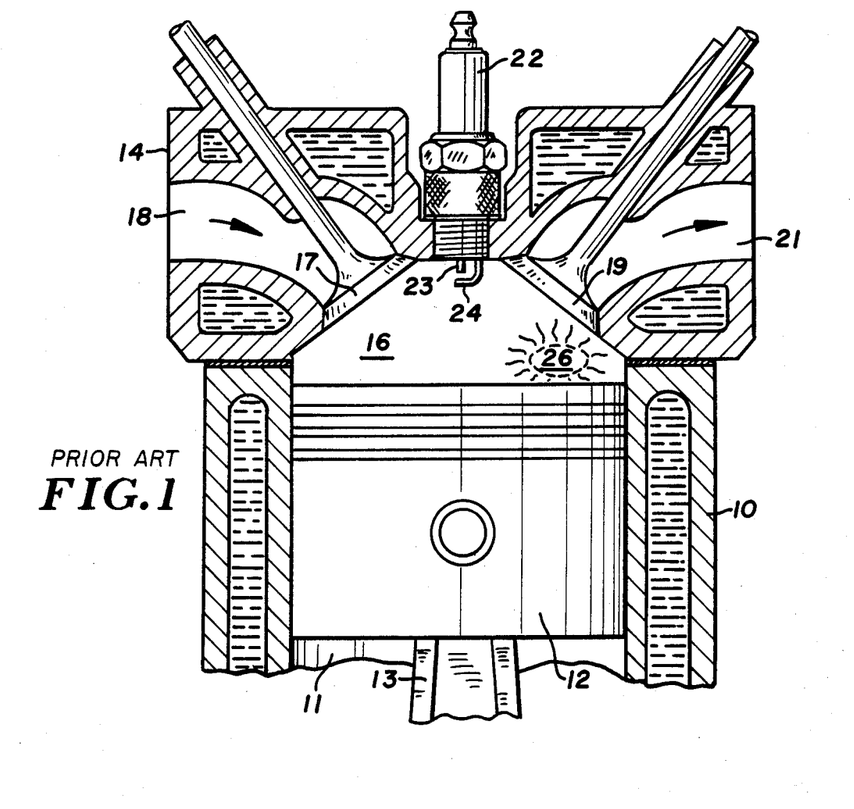
FIG. 1 is a fragmentary sectional view through a cylinder of a prior art internal combustion engine.

Referring to FIG. 1, there is shown a fragmentary sectional view of a piston and cylinder structure of a conventional internal combustion engine. The engine has a block 10 having an upright cylindrical inside wall 11. A cylindrical piston 12 is located in sliding reciprocating engagement with inside wall 11. Piston 12 is connected to a piston rod 13, which has the usual bearing connection with a crankshaft (not shown). A head 14 is located over the block 10. Conventional head bolts (not shown) attach the head 14 to block 10. Head 14 has a generally cone-shaped combustion chamber 16 located in alignment with the top of piston 12. An intake valve 17 reciprocally mounted on head 14 is operable in response to a rotating cam to selectively open and close intake passage 18 for carrying an air/fuel mixture to combustion chamber 16. An exhaust valve 19 mounted for reciprocal motion on head 14 is operable to selectively open and close exhaust passage 21 for carrying exhaust gases from combustion chamber 16 to an exhaust manifold (not shown). A second rotating cam (not shown) is operable to reciprocate exhaust valve 19.

Figure 2:
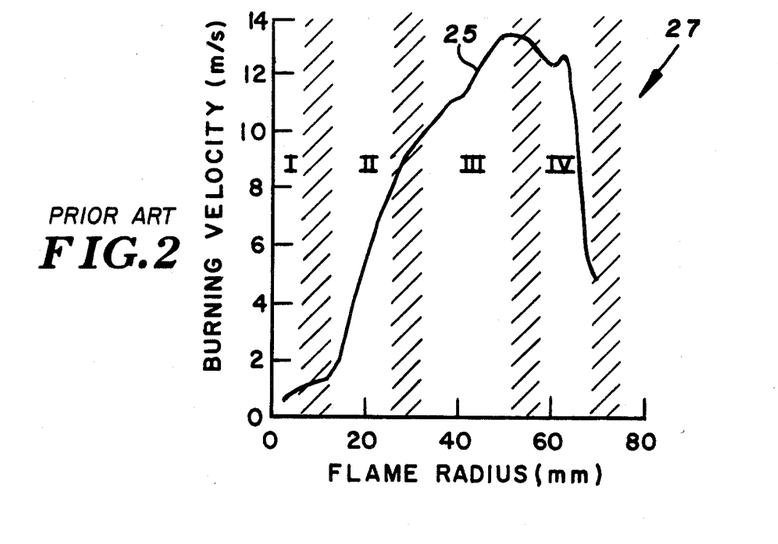
FIG. 2 is a diagram of normal flame speed behavior within a cylinder of an internal combustion engine.

A spark plug 22 is mounted on head 14 between the valves 17 and 19. Spark plug 22 has spaced electrodes 23 and 24 located in the central top portion of combustion chamber 16. When an electric potential is supplied to spark plug 22, an ignition spark between electrodes 23 and 24 ignites the air/fuel mixture in combustion chamber 16. The ignition of the air/fuel mixture in the combustion chamber 16 originates at spark plug electrodes 23 and 24 and radiates therefrom in a flame front. The flame front, illustrated as line 25 in FIG. 2, is divided into four combustion stages. In the final stage, the unburned compressed gas sometimes ignites spontaneously before the arrival of the flame front. This is shown in FIG. 1 at 26, and may result in knock.

Referring to FIG. 2, there is shown a graphic representation indicated at 27 of the burning velocity of the air/fuel mixture or flame front in a combustion chamber of an internal combustion engine plotted as a function of the flame radius from the ignition location. The combustion episode in chamber 16 is divided into four stages. The initial stage 1 is the ignition of about 1% of the fuel mass. The second stage II and third stage III is a rapid flame acceleration and exhibits the peak flame speed. In the final stage IV flame speed has a rapid de-acceleration as the flame front interacts with the head block and piston walls. If detonation occurs instead, it moves at supersonic speeds across the combustion chamber. It is accompanied by large pressure differences which can fatigue or damage engine components. Detonation in conventional internal combustion engines is now evited by maintaining the compression ratio at relatively low values. This limits the thermal efficiency of the engine.

Figure 3:
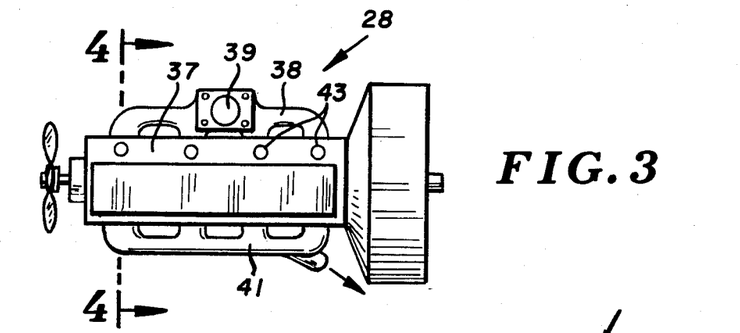
FIG. 3 is a top plan view of an Otto cycle internal combustion engine having the piston and combustion chamber of the invention.
Figure 4:
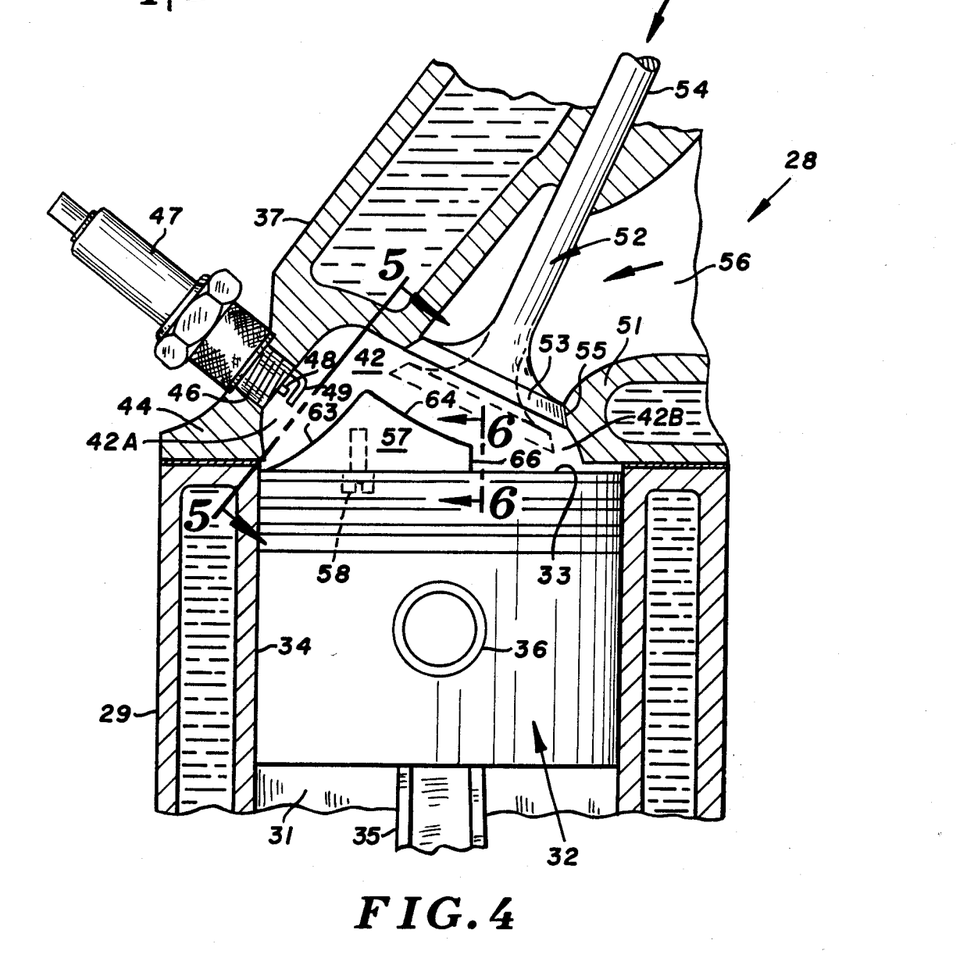
FIG. 4 is an enlarged fragmentary sectional view taken along the line 4—4 of FIG. 3.
Figure 5:
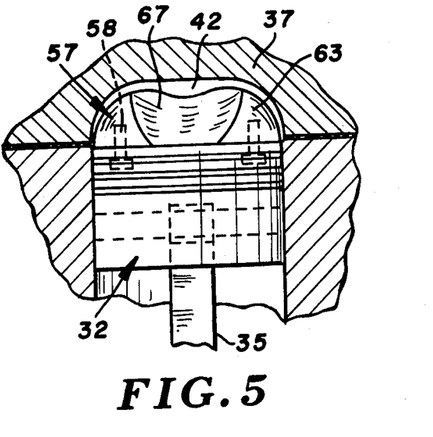
FIG. 5 is a sectional view taken along the line 5—5 of FIG. 4.
Figure 6:
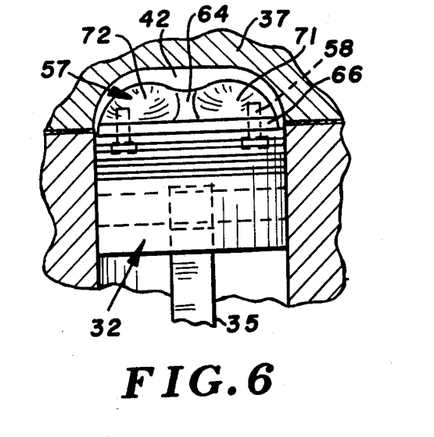
FIG. 6 is a sectional view taken along the line 6—6 of FIG. 4.

Referring to FIGS. 3 and 4, there is shown an internal combustion engine indicated generally at 28 having a block 29 and a head 37 attached to the top of block 29 with a plurality of head bolts 43. Engine 28 is a valve-in-head engine having a plurality of reciprocating pistons 32 operatively connected to a rotating crankshaft (not shown) with connecting rods 35 in a conventional manner. As shown in FIG. 4, block 29 has an upright inside cylindrical wall 31 accommodating a reciprocating piston 32. Piston 32 has a generally flat circular top wall 33 or face 33 and a cylindrical side wall 34 located in close proximity to the inside cylindrical wall 31. Piston rod 35 is connected to wall 34 with a wrist pin 36. A conventional bearing connects rod 35 to the crankshaft whereby, on rotation of the crankshaft, piston 32 reciprocates in the cylinder bore defined by wall 31. The engine has an Otto engine cycle wherein piston 32 has intake, compression, power, and exhaust movements.

As shown in FIG. 4, head 37 has a combustion chamber 42 located over top wall 33 of piston 32. Head 37 has a first generally upright and inwardly inclined wall portion 44 having a threaded hole 46 accommodating a spark plug 47. Spark plug 47 has electrodes 48 and 49 located in combustion chamber 42. Electrodes 48 and 49 are located generally along a diametric upright plane bisecting the top 33 of piston 32. Electrodes 48 and 49 are positioned above an outer edge portion of piston 32.

Head 37 has a second wall portion 51 joined to the upper end of the first wall portion 44. Second wall portion 51 extends downwardly toward the diametrically opposite side of piston 32 to converge the combustion chamber 42 to an area opposite spark plug 47. Wall portion 51 has ports accommodating intake and exhaust valves. FIG. 4 shows the intake valve 52 reciprocally mounted on head 37 for movement between the closed position shown in full lines and an open position shown in broken lines. Conventional rotating cam and rocker arm structures are used to reciprocate valve 52. Valve 52 has a cylindrical head 53 joined to a stem 54. Head 53 engages an annular valve seat 55 to close the intake passage 56 leading from intake manifold 38 to combustion chamber 42. When valve 52 has been moved to the open position, as shown in broken lines, the fuel/air mixture flows through passage 56 into combustion chamber 42. Head 37 is provided with an exhaust valve 60 similar to valve 52. The exhaust valve is operable to move between open and closed positions to provide for the flow of exhaust gases from combustion chamber 42.

Referring to FIGS. 4–9, a cap or member indicated generally at 57 is secured to the top of piston 32 with a plurality of bolts 58. The bolts 58 extend upwardly through the top wall 33 of piston 42 and are threaded into suitable holes in cap 57. Other means, such as adhesives, can be used to secure cap 57 to top wall 33 of piston 32. Cap 57 can be integral with the top of piston 32 so that the piston and the cap are a one-piece unit.

Figures 7, 8, 9:
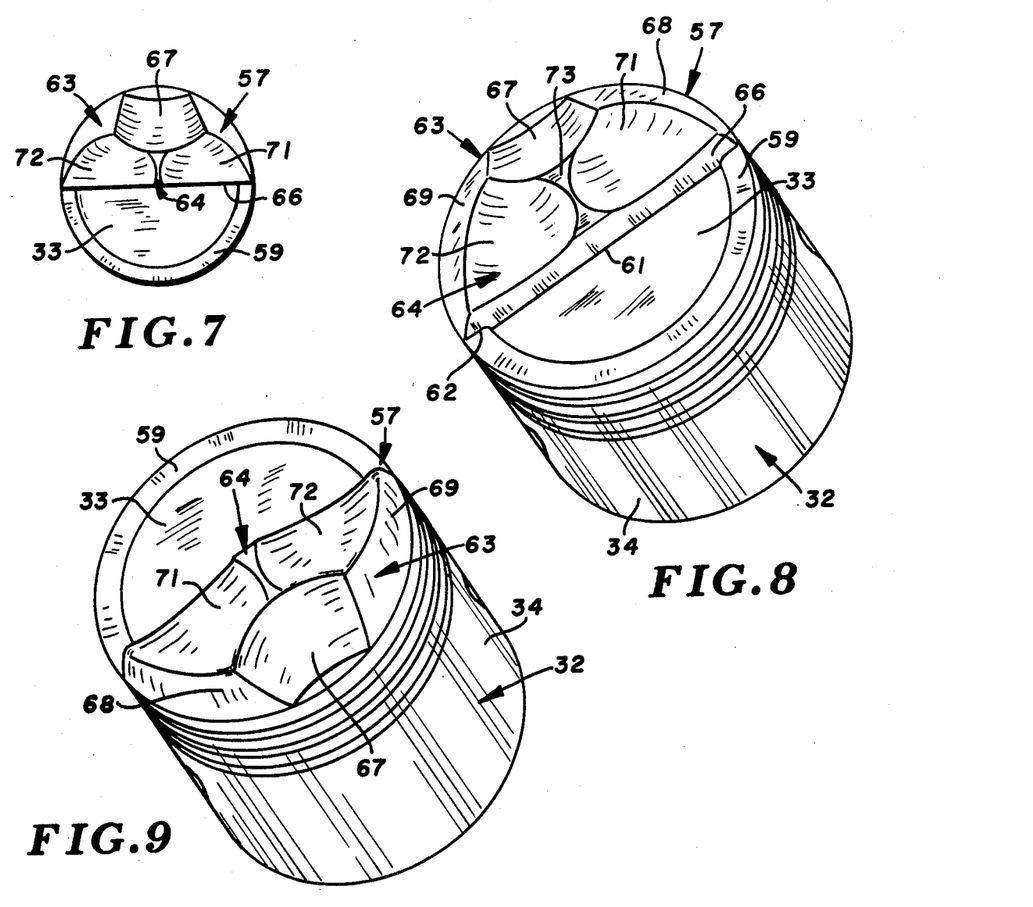
FIG. 7 is a top plan view of the piston of FIG. 6.
FIG. 8 is a perspective view of the valve side of the piston and cap secured to the top of the piston of FIG. 4.
FIG. 9 is a perspective view similar to FIG. 8 of the spark plug side of the piston and cap thereon.

As shown in FIGS. 7, 8, and 9, the top wall or top 33 of piston 32 has an annular rim 59 surrounding the outer peripheral edge of top wall 33. Cap 57 has a generally flat bottom 61 that is in surface engagement with top wall 33. The outer edge of bottom 61 has an arcuate peripheral shoulder 62 that rests on a portion of rim 59. The top of piston 32 may be flat. The cap for a flat top piston has a flat bottom secured to the piston. Cap 57 can be integral with the top of the piston.

Cap 57 has an upwardly and inwardly directed forward or front, indicated generally at 63, that is joined to a downwardly and inwardly sloping back, indicated generally at 64. Back 64 is joined to an end or wall 66 that forms a step with top wall 33. Wall 66 located generally normal to top wall 33 of piston 32 extends across the diameter of the top of piston 32 generally normal to the direction of movement of the flame front. Wall 66 provides an abrupt increase in the cross sectional area of the combustion chamber portion 42B in the direction of flame travel. Wall 66 has a height of about 5 to 10 mm throughout its diametric length of about 8.5 cm. Other sizes and size relationships may be used to provide wall 66.

As shown in FIGS. 5, 7, 8, 9, and 11, front 63 of cap 57 has a central concave first channel or pocket 67 extended from the lower edge of cap 57 upwardly and inwardly toward the inner edge of the cap. Channel 67 has opposite outwardly curved sides that diverge from the lower edge of the cap. The upper ends of the sides are joined to an inwardly curved upper edge. The curved sides and curved upper edge have substantially the same curve lengths. The mid-portion of the curved upper edge is located at approximately the mid-point of cap 57. The face of the bottom of channel 67 has a generally symmetrical radical concave curvature. The radial concave curvature is larger than the lateral concave curvature. The center of channel 67 is located along and in alignment with the longitudinal axis of spark plug 47. As shown in FIG. 4, front 63 is spaced from electrodes 48 and 49 of spark plug 47 providing combustion chamber 42 with an upwardly and inwardly inclined forward portion 42A. Chamber portion 42A diverges upwardly and inwardly from the outer peripheral edge of the top of cylinder wall 31 when the piston is in the top dead center, as shown in FIG. 4. Back 64 slopes inwardly and downwardly toward transverse wall 66 providing the combustion chamber with a diverging or increasing cross sectional area 42B.

Returning to FIGS. 8 and 9, the front has convex side portions 68 and 69 extended from opposite sides of pocket 67 to the transverse wall 66. Side portions 68 and 69 converge from the side edges of channel 67 to the opposite ends of transverse wall 66.

Back 64 has a pair of shallow concave diverging channels or pockets 71 and 72 separated by a downwardly and inwardly inclined mid-section or rib 74. Channels 71 and 72 are located on opposite sides of a diametrical plane bisecting channel 67 and provide second paths of the flame front and detonation energy. Channels 71 and 72 have identical shapes and curvatures and extend from the top edge of channel 67 to the transverse wall 66. The outside edge of channel 71 joins the upper curved edge of side 68. The outside edge of channel 72 joins the upper edge of side 69.

Figure 10:
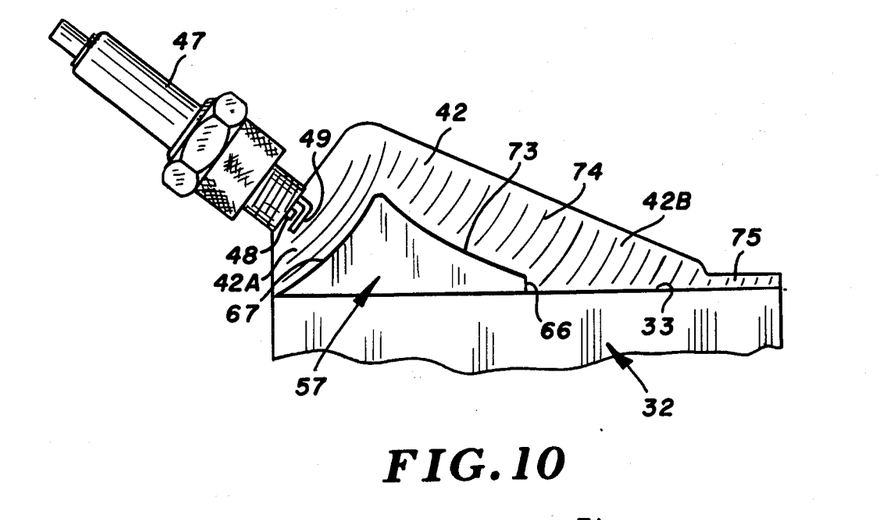
FIG. 10 is a vertical diagram of the combustion chamber with the piston at top dead center.
Figures 11, 12:
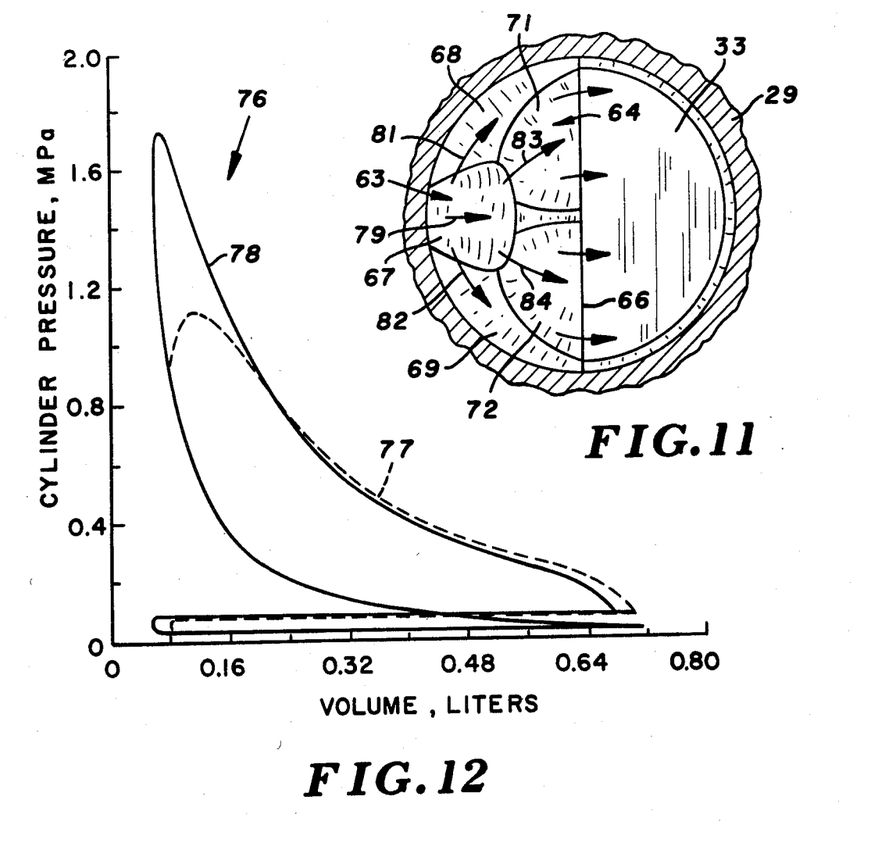
FIG. 11 is a horizontal diagram of the combustion chamber with the piston at top dead center.
FIG. 12 is a cylinder pressure-volume diagram comparing the engine of the invention with a prior art internal combustion engine.

Referring to FIGS. 10 and 11, there is shown a diagram of the combustion chamber 42 with the piston 32 in the top dead center at the completion of the compression stroke. The air/fuel mixture in combustion chamber 42 has been ignited by an electrical spark generated between the electrodes 48 and 49 of spark plug 47. The initial ignition occurs at the electrodes 48 and 49 and commences a flame front that propagates in an arc from the ignition point in the radial direction from electrodes 48 and 49 across combustion chamber 42.

The flame front moves from first path 79 and side paths 81 and 82 to second paths 83 and 84 provided by channels 71 and 72. Second paths 79 and 81 diverge toward the middle transverse plane of the piston face 33 and terminate at transverse wall 66. The flame front continues along the second portion 42B of the combustion chamber 42 into terminal portion 75 of the combustion chamber. The flame front passes over transverse wall 66. The abrupt or sudden change in the cross sectional area along the path of the flame's travel of chamber 42B after wall 66 causes attenuation of detonation and/or incipient detonation. Channels 76, 71, and 72 and wall 66 increase the turbulence intensity of the air/fuel mixture and, thus, enhance combustion. The turbulent gas motions throughout combustion chamber 42 affect the burning rate of the fuel, as well as the efficiency of the engine. This occurs simultaneously with the attenuation of detonation or incipient detonation. The reduction of detonation or incipient detonation allows the engine to operate at higher compression ratios without incurring damage. The high compression ratios increase the thermal efficiency of the engine.

Referring to FIG. 12, there is shown a pressure-volume diagram for a conventional piston and cylinder of an internal combustion engine and the piston and cylinder equipped with the cap 57 of the invention. The dotted line curve 77 represents the pressure-volume curve in the four stroke cycle of a conventional piston and cylinder arrangement. The full line shows the curve for a piston equipped with the cap 57. There is a substantial increase in the pressure of the air/fuel mixture in the combustion chamber in curve 78 caused by the cap 57. This increase in pressure results in the greater efficiency and output power of the internal combustion engine.

Figure 13:
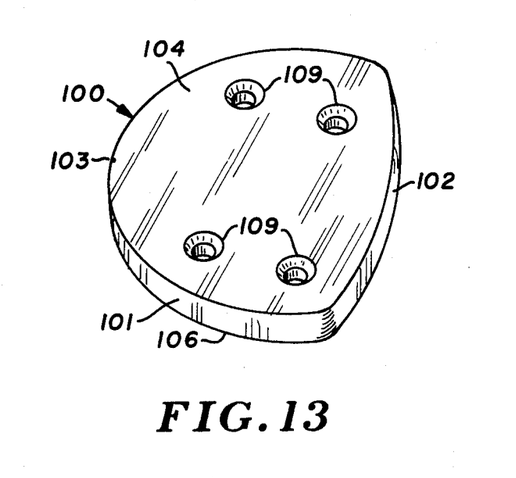
FIG. 13 is a perspective view of a modification of the cap adapted to be secured to the top of a piston of an internal combustion engine.
Figure 14:
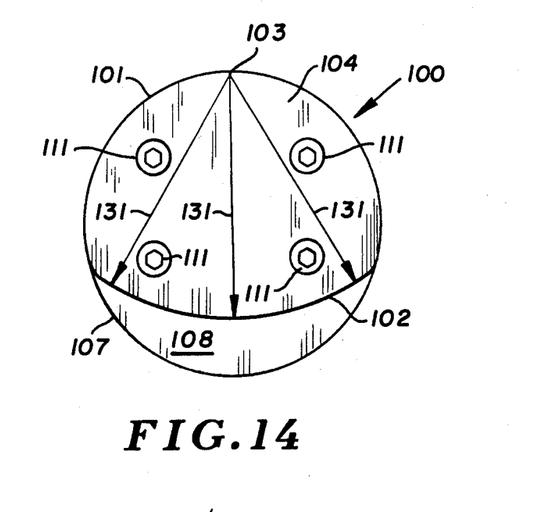
FIG. 14 is a top plan view of a piston equipped with the cap of FIG. 13.
Figure 15:
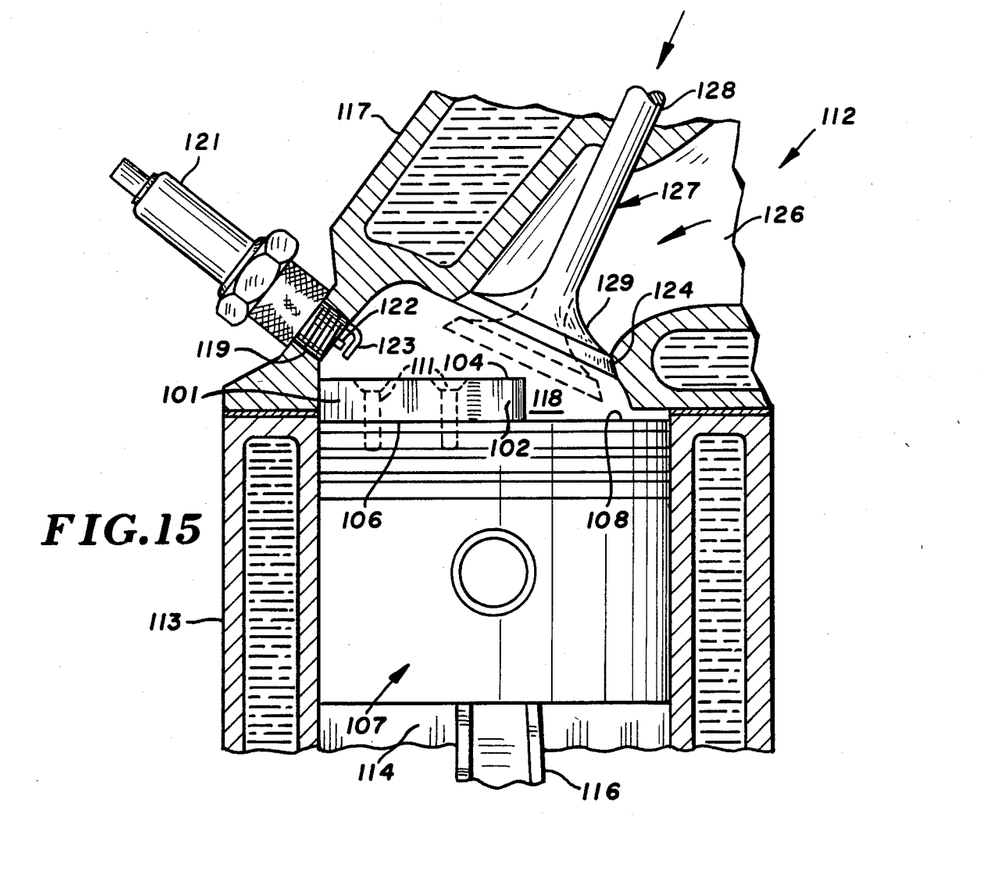
FIG. 15 is a sectional view similar to FIG. 14 showing a piston equipped with the cap of FIG. 13.

A modification of the cap for a piston of an internal combustion engine of the invention providing an abrupt increase in the cross sectional area of the combustion chamber in the direction of the flame front travel is shown in FIGS. 13–15. Referring to FIG. 13, cap 100 is a one-piece metal member having a generally semi-circular outer edge 101 curved to conform the outside of the top of a piston. Edge 101 has an arc of about 180 degrees. The edge can have an arc that is greater than or less than 180 degrees. Opposite ends of edge 101 are located adjacent diametrically opposite sides of the top of piston 107. Cap 100 has a convex curved front wall 102. A radius center 103 midway between the ends of outer edge 102 determines the radius of the arced front wall 102. Radius center 103 is located in close proximity to the electrodes of the spark plug of the engine. Cap 100 has a generally flat top 104 and a flat bottom 106. The cap 100 has a generally uniform thickness. Preferably, the cap 100 has a thickness of 7 mm. Other thicknesses of the cap can be used.

As shown in FIGS. 14 and 15, cap 100 is located on the top 108 of piston 107. The cap has a plurality of holes 109 accommodating bolts 111 secured to the top of piston 107. Other attaching structures can be used to secure cap 100 to the top 108 of piston 107. Cap 100 can be integral with the metal of piston 107.

Referring to FIG. 15, there is shown an internal combustion engine indicated generally at 112 similar to the engine 28, shown in FIG. 3, having a block 113 and a head 117. Block 113 has a generally upright cylinder 114 reciprocally accommodating piston 107. Piston 107 is attached to a connecting rod 116 operatively connected to a rotating crankshaft (not shown). The upper end of cylinder 114 and head 117 forms a combustion chamber 118 located over the top of piston 107. The head 117 has a threaded hole 119 accommodating a spark plug 121. Spark plug 121 has electrodes 122 and 123 located above an outer edge portion of piston 107. The head 117 has a passage or port 126 terminating in an annular valve seat 124 open to combustion chamber 118. A reciprocating valve indicated generally at 127 cooperates with the head and seat 124 to control the flow of air/fuel mixture into combustion chamber 118. A conventional rotating cam and rocker arm structure (not shown) is used to reciprocate valve 127. Valve 127 has a cylindrical stem 128 integral with an annular head 129. The head 117 is provided with an exhaust valve similar to intake valve 127.

Cap 100, as shown in FIGS. 14 and 15, is secured to the top 108 of piston 107 with the bolts 111. The radius center 103 is located in close proximity to the spark plug electrodes 122 and 123. The outer edge 101 is located in vertical alignment with the outer wall of piston 107. This locates the front wall 102 of cap 100 across the mid-section of piston top 108. The central portion of wall 102 is located slightly forward of the center of top 108. Front wall 102 projects upward generally normal to the top of piston 107 and extends to opposite portions of the piston top.

As shown in FIG. 15, piston 107 is in the top dead position at the completion of the compression stroke. The air/fuel mixture in combustion chamber 118 is compressed and has been ignited by the electrical spark generated between electrodes 122 and 123 of spark plug 121. The initial ignition of the air/fuel mixture occurs at the electrodes 122 and 123 and commences a flame front that propagates in a generally radial direction, indicated by arrows 131 in FIG. 4, along an arc from the ignition point across the combustion chamber 118. The flame front passes over the generally transverse wall 102, thereby suddenly encountering an increase in cross sectional area of the combustion chamber in the direction of the movement of the flame front. The abrupt change in the cross sectional area along the path of the flame front travel of the combustion chamber causes attenuation of detonation and/or incipient detonation. The abrupt change in the cross sectional area of the combustion chamber is generally normal to the direction of movement of the flame front. The reduction of the detonation and incipient detonation allows the engine to operate at a higher compression ratio without incurring damage. The higher compression ratios increase the thermal efficiency of the engine.

While there has been shown and described the several preferred embodiments of the piston, cap, and combustion chamber of the invention, it is understood that changes in the size, shape, and structure may be made by those skilled in the art without departing from the invention. The invention is defined in the following claims.

The embodiments of the invention in which an exclusive property or privilege is claimed are defined as follows:

1. A method of attenuating detonation in an internal combustion engine having inside cylindrical wall means, a combustion chamber, and piston means reciprocally located within said cylindrical wall means, said piston means having an air/fuel mixture intake, compression, power, and exhaust movements comprising: providing an air/fuel mixture in the combustion chamber during intake movement of the piston means, compressing said air/fuel mixture in the combustion chamber during compression movement of the piston means, igniting said compressed air and fuel mixture with a spark in the combustion chamber at an ignition point located contiguous to one portion of the inside cylindrical wall means at completion of the compression movement of the piston means whereby the air/fuel mixture burns establishing a flame front that propagates from the ignition point across the combustion chamber, abruptly increasing cross sectional area of the combustion chamber in a direction of travel of the flame front after the entire flame front passes over a maximum width of the combustion chamber that is normal to a diameter line passing through said ignition point, and expanding the burning air/fuel mixture in the combustion chamber during power movement of the piston means, and exhausting the burned air/fuel mixture from the combustion chamber during the exhaust movement of the piston means.

2. The method of claim 1 wherein: the cross sectional area of a combustion chamber is abruptly increased transversely across a mid-section of the top of the piston means.

3. The method of claim 1 wherein: the cross sectional area of the combustion chamber is abruptly increased adjacent a linear wall projected upwardly from a top of the piston means, said wall extending generally normal to the direction of movement of the flame front in said combustion chamber.

4. The method of claim 3 wherein: said linear wall extends across a diameter of the top of the piston means, said diameter being generally normal to the movement of the flame front in said combustion chamber.

5. The method of claim 1 wherein: the cross sectional area of the combustion chamber is abruptly increased along a convex curve extended across a mid-section of a top of the piston means.

6. The method of claim 5 wherein: the convex curve has a radius center located in contiguous relation to the ignition point of the air/fuel mixture in the combustion chamber.

7. The method of claim 5 wherein: said convex curve has opposite ends located adjacent opposite diametric portions of the top of the piston means.

8. The method of claim 1 wherein: the cross sectional area of the combustion chamber is abruptly increased adjacent a convex curved wall projected upwardly from a top of the piston means, said wall being located generally normal to the direction of movement of the flame front in said combustion chamber.

9. The method of claim 8 wherein: said convex curved wall has opposite ends located adjacent opposite diametric portions of the top of the piston means.

10. The method of claim 8 wherein: said convex curved wall has a radius center located in contiguous relation to the ignition point of the air/fuel mixture in the combustion chamber.

11. A method of attenuating detonation in an internal combustion engine having inside cylindrical wall means, a combustion chamber, and piston means reciprocally located within said cylindrical wall means, said piston means having an air/fuel mixture intake, compression, power, and exhaust movements comprising: providing an air/fuel mixture in the combustion chamber during intake movement of the piston means, compressing said air/fuel mixture in the combustion chamber during compression movement of the piston means, igniting said compressed air and fuel mixture with a spark at the completion of the compression movement of the piston means whereby the air/fuel mixture burns establishing a flame front that propagates across the combustion chamber, dividing the flame front into at least one diverging first path during the propagation thereof across the combustion chamber, separating said one first path into separate diverging second paths to further divide detonation energy, each of said second paths having a terminal portion abruptly increasing cross sectional area of the combustion chamber in a direction of travel of the flame front at the terminal portion of said second paths and expanding the burning air/fuel mixture in the combustion chamber during power movement of the piston means, and exhausting the burned air/fuel mixture from the combustion chamber during the exhaust movement of the piston means.

12. The method of claim 11 wherein: said first path includes a central generally radial path terminating at entrances to the second paths.

13. The method of claim 11 wherein: the second paths comprise a pair of paths provided by a pair of divergent channels associated with the piston means.

14. The method of claim 11 wherein: the first path diverges toward a center of the combustion chamber, and the second paths include a pair of paths located adjacent opposite sides of a radial line passing through the first path.

15. The method of claim 11 wherein: the cross sectional area of the combustion chamber is increased along a diameter of the piston means, said diameter being generally normal to the movement of the flame front in said combustion chamber.

16. The method of claim 11 wherein: the cross sectional area of the combustion chamber is abruptly increased transversely across a mid-section of a top of the piston means.

17. The method of claim 11 wherein: the cross sectional area of the combustion chamber is abruptly increased adjacent a wall projected generally normally upward from a top of the piston means, said wall extending generally normal to the direction of movement of the flame front in said combustion chamber.

18. The method of claim 11 wherein: the first path includes a centrally located radial path and side paths on opposite sides of the radial path, said radial path and side paths being in communication with the second paths.

19. The method of claim 18 wherein: said second paths comprise a pair of paths open to the radial path and side paths.

20. The method of claim 11 wherein: the cross sectional area of the combustion chamber is abruptly increased adjacent a linear wall projected upwardly from a top of the piston means, said wall being located generally normal to the direction of movement of the flame front in said combustion chamber.

21. The method of claim 20 wherein: said linear wall extends across a diameter of the top of the piston means, said diameter being generally normal to the movement of the flame front in said combustion chamber.

* * * * *